US009078091B2

(12) United States Patent
Lehtiniemi et al.

(10) Patent No.: US 9,078,091 B2
(45) Date of Patent: Jul. 7, 2015

(54) METHOD AND APPARATUS FOR GENERATING MEDIA BASED ON MEDIA ELEMENTS FROM MULTIPLE LOCATIONS

(75) Inventors: Arto Juhani Lehtiniemi, Lempaala (FI); Juha Henrik Arrasvuori, Tampere (FI); Antti Johannes Eronen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 13/462,363

(22) Filed: May 2, 2012

(65) Prior Publication Data
US 2013/0295961 A1 Nov. 7, 2013

(51) Int. Cl.
H04W 4/02 (2009.01)
H04W 4/20 (2009.01)
(52) U.S. Cl.
CPC .............. *H04W 4/02* (2013.01); *H04W 4/206* (2013.01)
(58) Field of Classification Search
USPC ........................................ 455/456.3, 456.1
See application file for complete search history.

(56) References Cited

U.S. PATENT DOCUMENTS

| 5,060,273 | A | * | 10/1991 | Olah et al. ..................... 381/119 |
| 5,170,252 | A | * | 12/1992 | Gear et al. ...................... 348/659 |
| 5,250,745 | A | * | 10/1993 | Tsumura ..................... 434/307 A |
| 5,307,456 | A | * | 4/1994 | MacKay ........................ 715/782 |
| 5,647,008 | A | * | 7/1997 | Farhangi et al. .............. 381/119 |
| 5,754,254 | A | * | 5/1998 | Kobayashi et al. ............ 348/578 |
| 7,978,207 | B1 | | 7/2011 | Herf et al. |
| 2003/0139933 | A1 | * | 7/2003 | Kimmel ......................... 704/275 |
| 2005/0060640 | A1 | * | 3/2005 | Ross et al. .................. 715/500.1 |
| 2005/0076073 | A1 | * | 4/2005 | Gurrapu ......................... 708/300 |
| 2005/0105442 | A1 | * | 5/2005 | Melchior et al. ................. 369/83 |
| 2006/0085383 | A1 | | 4/2006 | Mantle et al. |
| 2006/0153397 | A1 | * | 7/2006 | Foster ............................. 381/77 |
| 2006/0288350 | A1 | * | 12/2006 | Grigorovitch et al. ........ 718/107 |
| 2007/0098368 | A1 | * | 5/2007 | Carley et al. ..................... 386/96 |
| 2007/0174430 | A1 | | 7/2007 | Tedman et al. |
| 2008/0243278 | A1 | * | 10/2008 | Dalton et al. .................... 700/94 |

(Continued)

FOREIGN PATENT DOCUMENTS

| EP | 2 267 716 A2 | 12/2010 |
| WO | 2004/003788 A2 | 1/2004 |
| WO | 2010/062585 A2 | 6/2010 |

OTHER PUBLICATIONS

Code-It Software Solutions, Record Speaker Output, pp. 1-16, www.code-it.com/record_speaker_output.htm.

(Continued)

*Primary Examiner* — Jinsong Hu
*Assistant Examiner* — Jean Chang
(74) *Attorney, Agent, or Firm* — Ditthavong & Steiner, P.C.

(57) ABSTRACT

An approach is provided for generating and sharing compositions based on media elements acquired from different locations. A media generation platform determines an association of one or more media elements with one or more locations. The media generation platform next determines one or more interactions with at least one connecting user interface element to associate the one or more media composition elements with one or more media composition applications. The media generation platform then causes a generation of at least one media composition that includes, at least in part, the one or more media composition elements based, at least in part, on the one or more interactions.

20 Claims, 13 Drawing Sheets

(56) References Cited

U.S. PATENT DOCUMENTS

| | | | |
|---|---|---|---|
| 2009/0019222 A1* | 1/2009 | Verma et al. | 711/114 |
| 2010/0077017 A1 | 3/2010 | Martinez et al. | |
| 2010/0180224 A1* | 7/2010 | Willard et al. | 715/773 |
| 2010/0211199 A1* | 8/2010 | Naik et al. | 700/94 |
| 2011/0013782 A1* | 1/2011 | Moomey | 381/87 |
| 2011/0019842 A1* | 1/2011 | Aoki | 381/119 |
| 2011/0050732 A1 | 3/2011 | Arrasvuori | |
| 2011/0055284 A1 | 3/2011 | Wallace et al. | |
| 2011/0078323 A1 | 3/2011 | Wooden | |
| 2012/0045189 A1* | 2/2012 | Singh et al. | 386/285 |
| 2012/0221687 A1* | 8/2012 | Hunter et al. | 709/219 |
| 2012/0243711 A1* | 9/2012 | Fujita et al. | 381/119 |
| 2013/0097244 A1* | 4/2013 | Manley et al. | 709/204 |
| 2013/0198422 A1* | 8/2013 | Subbiah et al. | 710/71 |
| 2013/0241840 A1* | 9/2013 | Durojaiye | 345/173 |

OTHER PUBLICATIONS

Steve's Digicams, Avid Media Composer 5: Creating a Multitrack Sequence, pp. 1-5, http://www.steves-digicams.com/knowledge-center/how-tos/video-software/avid-media-composer-5-creating-a.

International Search Report for related International Patent Application No. PCT/FI2013/050345 dated Jun. 28, 2013, 5 pages.

Written Opinion for related International Patent Application No. PCT/FI2013/050345 dated Jun. 28, 2013, 8 pages.

* cited by examiner

306

300

318

312

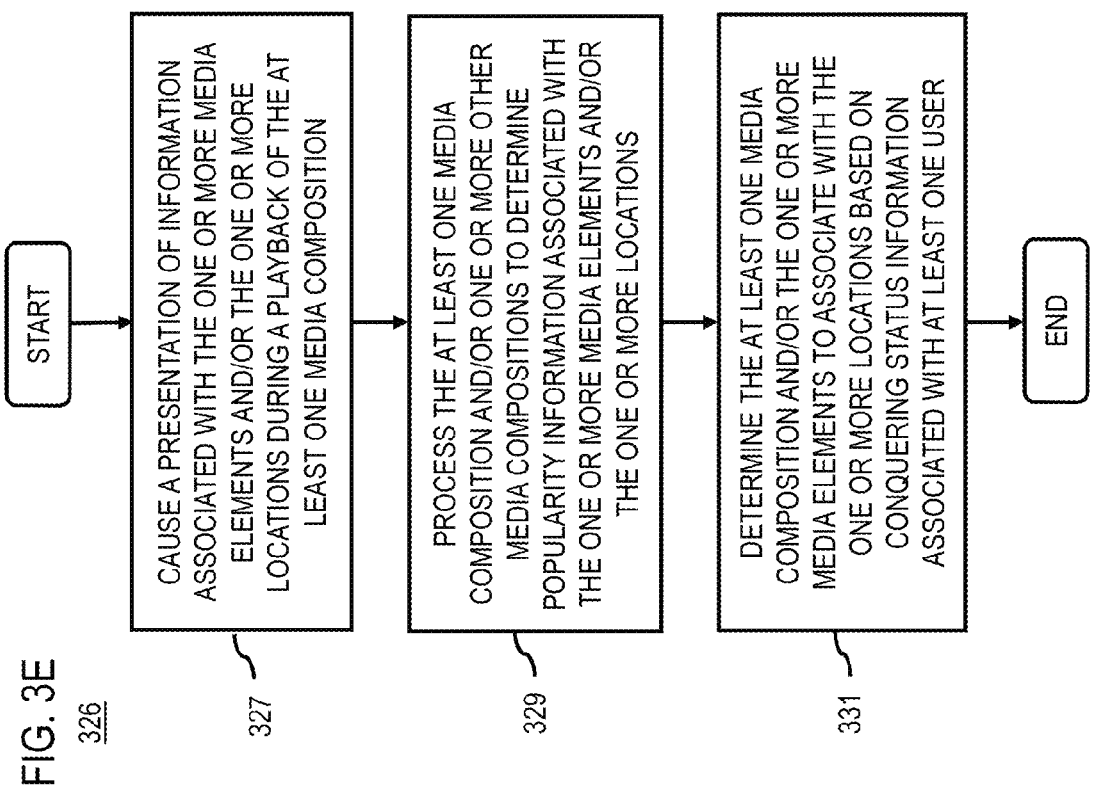

METHOD AND APPARATUS FOR GENERATING MEDIA BASED ON MEDIA ELEMENTS FROM MULTIPLE LOCATIONS

BACKGROUND

Service providers and device manufacturers (e.g., wireless, cellular, etc.) are continually challenged to deliver value and convenience to consumers by, for example, providing compelling network services. One area of interest has been the development of services and technologies related to content generation (e.g., music, television, video, etc.) on mobile devices such as mobile phones and/or tablets. For example, in recent years, services have offered users the ability to select various media elements related to different subject matters and genres (e.g., classical, rock, sports, news, amateur, etc.). Some of the services further allow users to sample or mix various media elements for enabling the generation of new compositions. However, users are unable to readily associate a selected media element with its point of origination. Accordingly, service providers and device manufacturers face significant technical challenges in providing a service that enables users to personalize and share media elements with other users in connection with location data (e.g., a map).

SOME EXAMPLE EMBODIMENTS

Therefore, there is a need for an approach for generating and sharing compositions based on media elements acquired from different locations.

According to one embodiment, a method comprises causing, at least in part, an association of one or more media elements with one or more locations. The method also comprises determining one or more interactions with at least one connecting user interface element to associate the one or more media composition elements with one or more media composition applications. The method further comprises causing, at least in part, a generation of at least one media composition that includes, at least in part, the one or more media composition elements based, at least in part, on the one or more interactions.

According to another embodiment, an apparatus comprises at least one processor, and at least one memory including computer program code for one or more computer programs, the at least one memory and the computer program code configured to, with the at least one processor, to cause, at least in part, an association of one or more media elements with one or more locations. The apparatus is also caused to determine one or more interactions with at least one connecting user interface element to associate the one or more media composition elements with one or more media composition applications. The apparatus is further caused to cause a generation of at least one media composition that includes, at least in part, the one or more media composition elements based, at least in part, on the one or more interactions.

According to another embodiment, a computer-readable storage medium carries one or more sequences of one or more instructions which, when executed by one or more processors, cause, at least in part, an association of one or more media elements with one or more locations. The apparatus is also caused to determine one or more interactions with at least one connecting user interface element to associate the one or more media composition elements with one or more media composition applications. The apparatus is further caused to cause, a generation of at least one media composition that includes, at least in part, the one or more media composition elements based, at least in part, on the one or more interactions.

According to another embodiment, an apparatus comprises means for causing, at least in part, an association of one or more media elements with one or more locations. The apparatus also comprises means for determining one or more interactions with at least one connecting user interface element to associate the one or more media composition elements with one or more media composition applications. The apparatus further comprises means for causing, at least in part, a generation of at least one media composition that includes, at least in part, the one or more media composition elements based, at least in part, on the one or more interactions.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A-3E are flowcharts of exemplary processes for generating and sharing compositions based on media elements acquired from different locations, according to various embodiments;

DESCRIPTION OF SOME EMBODIMENTS

Examples of a method, apparatus, and computer program for generating and sharing compositions based on media elements acquired from different locations are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to a map interface for presentment of media element locations, it is contemplated that the approach described herein may be used with other means of representing location based data, including text and voice based representations, lists, etc.

Figure 1:
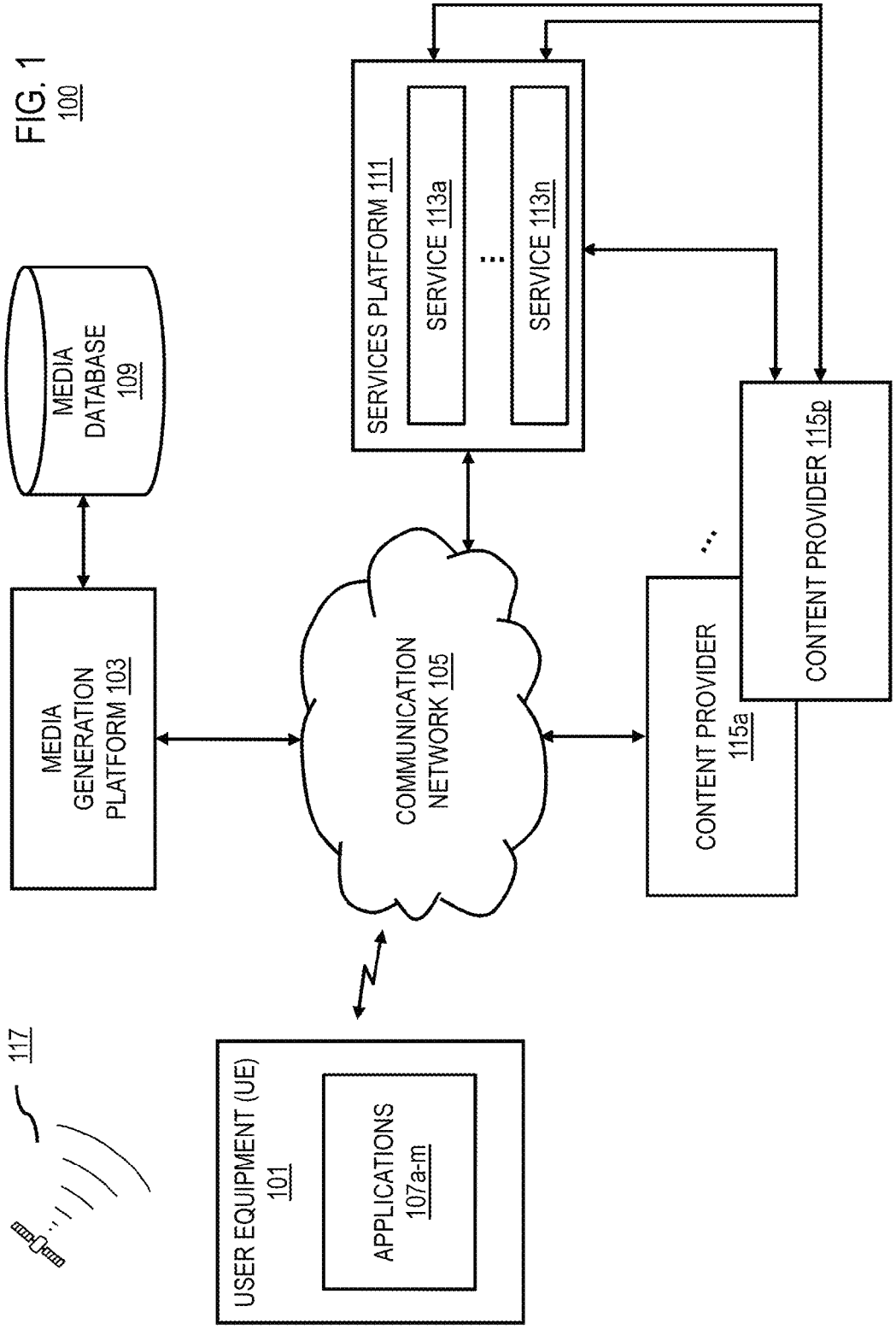
FIG. 1 is a diagram of a system capable of generating and sharing compositions based on media elements acquired from different locations, according to one embodiment.

FIG. 1 is a diagram of a system capable of generating and sharing compositions based on media elements acquired from different locations, according to one embodiment. As previously discussed, one area of interest among service providers and device manufactures has been the development of services and technologies related to streaming media (e.g., music, television, video, etc.) on mobile devices (e.g., mobile phones and/or tablets). This includes, for example, applications and services for enabling the mixing of media elements for generating entirely new and/or adapted compositions. Traditional approaches to enabling mixing, sampling and other forms of processing of media elements limits the ability of users to associate a selected media element with a point of origination. As such, users are not able to identify the specific location of a particular media element that is used in whole or part within a media composition. Furthermore, users have no means by which to identify a correlation between a particular geographic location and a specific media sample (e.g., by popularity).

To address this problem, a system 100 of FIG. 1 introduces the capability of associating a specific location (e.g., by address, region, territory) with a given media element, mixing at least one additional element on top of a media element. In one embodiment, the system 100 includes a media generation platform 103 that is configured to permit the selection of media elements, i.e., samples, music loops, clips and other content by a user in connection with a map interface. The map interface may contain one or more visual elements for representing the location of various media elements, thus enabling the user to visually determine a point of origination of the media element. A selection is carried out in the context of a media generation session by way of a virtual cable, which represents a connection between the element as located on the map interface and an input for use of said element within a music generation and/or listening application of a device (e.g., user equipment (UE) 101).

By way of example, the media generation platform 103 enables users to employ a media player, music mixer/sampler/sequencer, or other media rendering and/or generation applications at a local device to access various media elements. Under this scenario, the media generation platform 103 implements an application programming interface (API) for integrating various executions of the media generation platform 103 with available (e.g., third party) media rendering and/or generation applications. For example, existing media listening and/or generation applications, including for example, Fruity Loops, Cubase, Logic or the like, may implement new functionality using the API offered in connection with the media generation platform 103. Under this scenario, a patch bay or connectivity widget may be integrated or used in connection with the third party applications to permit linking of media elements with input channels of the application.

As such, applications 107a-107m at UE 101 may communicate with the media generation platform 103 over a communication network 105. It is noted that the media rendering and/or generation applications 107a-107m may be separate or combined applications. Alternatively, the application 107 may be a social networking application, book reader, a calendar application, or other software for use in connection with a media rendering and/or generation application. In either implementation, the media generation platform 103 facilitates execution of a user interface for representing media element locations in connection with a map interface. As per the API described above, the map interface may therefore be directly incorporated for use within an interface rendered for the application 107.

In addition, the media generation platform 103 enables a user to employ one or more media element selection/interaction techniques (e.g., virtual cables) for transference of media elements from a source to the respective application 107. For example, in the case of a music generation application, such as a music sequencer, the media generation platform 103 enables cables to be virtually connected from the representation of the media element (e.g., as an icon corresponding to the location) via the map interface to patch bay represented to an interface of the application 107. The patch bay is connected to an icon representing the media element as rendered to the map via the virtual cable in a manner similar to patching circuits in a patch bay of a recording and/or production studio. By way of the connection, samples can be patched with cables to the application 107 front-end for generating new compositions; the compositions featuring samples associated with a location represented on the map.

In certain embodiments, the media elements are accessed by applications 107a-107m from one or more content providers 115a-115p. The content providers 115 may provision a wide variety of content that is published and/or shared by various users or providers at different locations. Hence, the different locations correspond to different points of origination of the media elements. By way of example, a media element shared by a person located in South Africa will correspond to a location in South Africa. Similarly, a hosting service located in Alaska for maintaining items for a user from Canada corresponds to a location in Canada, unless otherwise specified by the user. It is noted that the content providers 115 may be a dedicated content sharing site, such as a shared music service. Alternatively, the content provider 115 may be an individual user that maintains a public and/or privately accessible data source for sharing of media elements.

Still further, the media generation platform 103 may be integrated for use in connection with a mapping service, location finder, or other location based service maintained by a services platform 111, corresponding to services 113a-113n. In certain embodiments, the media generation platform 103 associates the media elements accessed from the content providers 115 with respective locations within the map interface. The association is performed, based at least in part, on metadata provided by the user with respect to the one or more shared media elements, a user profile accessible by the platform 103, or a combination thereof. In the case of metadata, data for indicating the location of the content provider may be indicated to the media generation platform 103. It is noted that the media elements may be correlated with specific global positioning system (GPS) coordinates of a particular area (e.g., Harlem, Paris, Tokyo, etc.).

By way of interaction between the mapped location of respective media elements and the application 107, the media generation platform 103 enables applications 107a-107m to perform various media production, reproduction, editing, arranging and other generation procedures. For example, in one embodiment, the platform 103 enables a mixing of a first media element (e.g., a guitar riff) with a second media element to generate a mix composition. As another example, a first media element (e.g., guitar riff) may be sequenced for concurrent playback atop a commercial song for generating a remix of the song. The media elements, as ported via the virtual cable connection between the application 107 and the map interface, also enables execution of one or more time scale modification, beat matching, tempo matching, downbeat matching, rhythm matching, or other techniques. Still further, one or more mashups in multi-track compositions may be developed.

Still further, one or more volume knobs may be associated with patch bays of the media generation and/or listening application. As such, the volume of a media element to which a virtual cable or other connecting user interface element is tied via the map interface can be affected. Also, different modules can be attached in between the selected media element (e.g., a sample) and the patched connection to the front-end, including sound effects such as reverb, flanger, chorus, or delay. As a result, the system 100 enables the user to act as a Disc Jockey (DJ) or music producer. In the case of a media element corresponding to video and/or image data, the system 100 enables the user to act as a video or image editor. It is noted, therefore, that the media generation platform 103 supports any means of processing of the one or more mapped media elements for use in generating a personalized composition.

In one embodiment, the platform 103 enables a user to store, to share, or a combination thereof the one or more compositions generated per the one or more media elements. The compositions may be stored by the platform 103 to a media database 109, as one or more media files, where they may be subsequently retrieved by a calling application 107 (e.g., a media player at UE 101). Various media formats may be used for storing of the media compositions based on the application employed. As a result, one or more other users are able to view, to listen, to rate, to comment on, etc. the one or more media compositions generated by the user per the one or more media elements. Under this scenario, the one or more compositions may be stored 109 based, at least in part, on one or more predetermined parameters (e.g., most popular, funniest, etc.).

In one embodiment, the compositions as stored to the database 109 by may be presented to a user interface for selection by a user. The media compositions may be presented for selection, i.e., to a playlist, in conjunction with one or more commercial music selections. The commercial music collections correspond to those not composed with any of the identified media elements as rendered to a map interface. For the purpose of illustration, the customized compositions may be presented to the user as a list of available selections, with associated virtual cables shown extending from said selections to a corresponding location on the map for representing a location of a media element. In addition, a list of commercial songs for selection may also be shown. Under this scenario, users are able to patch songs from both categories for use in generating a playlist.

In addition, with the virtual cables being shown in connection with the media composition selections, users can see the origin of the samples used. For example, a personalized media composition entitled "Me and My Drum" may be associated with a media element (e.g., a drum loop) from a town in Dublin as presented visually to the corresponding map interface. As a further implementation, the user may change a virtual cable connection to create a new remix of the song. Thus, the user may disconnect a current virtual cable connection associated with a media composition (e.g., "Me and My Drum") and formulate a new connection with a different media element (e.g., a piano tune) as presented to the map. This results in a new media composition being generated, which the listening user may also have the option of renaming and subsequently adding to their playlist. It is noted that the composer of the media composition may be notified, such as by way of email or via a virtual counter/alert system, of accessing and/or adapting of one of their compositions.

In one embodiment, the media generation platform 103 monitors the level of accessing of or sharing of media compositions and/or media elements by users to determine a rate of conquering by territory. By way of example, a certain territory (e.g., country, state, city, region) corresponding to a particular concentration of locations of shared tracks, loops or samples may be persistently monitored. The higher the concentration of sharing and/or accessing activity, the greater the rate and/or level of conquering of the territory. Re-conquering of the territory, such as by another media selection, genre, publisher, etc., is dependent on (1) an amount of content shared in that territory and (2) the popularity of the shared content. Under this scenario, the publisher having a higher rate or level of conquering may have greater visibility on the map interface for influencing potential composers that are looking for media elements to sample, mix, etc. In addition, the platform 103 may adapt the presentation of the map in response to accessing of a media element or playback of a media composition featuring the element—i.e., highlight the region on the map corresponding to the media element.

The following is a summary of various details described above pertaining to system 100 for generating and sharing compositions based on media elements acquired from different locations:

- The media generation platform 103 enables users to access various samples (such as drum loops) linked to different areas of the world. The platform 103 may enable calling an API for rendering a map view, as provided by a mapping service 113, in conjunction with the user interface for depicting the various different areas of the world.
- The API may also enable the presentment and execution of various inactive elements in connection with the interface, including virtual cables for connecting samples to mapped locations. These connections can be used to create songs and mashups in multi-track or sequential way. Also several samples can be linked together and used as a single mashup sample. When a composer makes a connection to a sample for use in generating a composition, the sample is downloaded to their compatible composing software front-end (e.g., application 107).
- Listeners and consumers of content can listen to commercial media as well as composed media and patch them, i.e., via a virtual cable, to create personal playlists. When listening to a media composition, the user is able to see the sample patch connections and know where the samples are from (e.g., a drum loop from Mumbai, siren sound from New York and a synth riff from Finland). This gives extra user experience for the music listening to know where the samples and loops are from.
- Listeners and consumers can change the connections associated with a given media composition to create their own remixes of the songs, i.e., change samples of the songs.
- Each location on a map can have multiple samples to be shared. The ordering of the samples i.e. dominating sample for each territory can be determined by the popularity of the samples in compositions. The owner of each territory is the person who has shared most popular samples and/or loops for other people to use in their compositions. Popularity of samples corresponds to a level of conquering of a territory/location.

It is noted that the above described implementation permits seamless accessing of various media elements (e.g., samples, loops) from multiple different locations. The media generation platform 103 also services as a conduit service or platform for facilitating interaction between a mapping service for depicting the location of the media elements and an interface for enabling generation and/or listening to of media (e.g., a media player, a music production suite).

As shown in FIG. 1, the system 100 comprises a user equipment (UE) 101 (e.g., a mobile phone or tablet) having connectivity to a media generation platform 103 via a communication network 105. The UE 101 may include or have access to one or more applications 107a-107m (also collectively referred to as applications 107). By way of example, the applications 107 may include a media player application (e.g., a music, television, and/or video streaming application), a location-based application (e.g., a mapping and/or navigation application), a social networking application, an electronic book application, one or more organizational applications (e.g., a calendar, contacts, etc.), a web browser, a gaming application, etc. In certain embodiments, the applications 107 may also include one or more media sequencing, creating, editing, and/or mixing applications.

As noted previously, the UE 101 is also connected to a services platform 111 via the communication network 105. The services platform 111 includes one or more services 113a-113n (also collectively referred to as services 113). The services 113 may include a wide variety of services such as content provisioning services for the one or more applications 107 (e.g., location-based services, social networking services, Internet media elementing services, etc.). In addition, the UE 101 and the services platform 111 are also connected to one or more content providers 115a-115p (also collectively referred to as content providers 115) via the communication network 105. The content providers 115 also may provision a wide variety of content (e.g., one or more media elements, one or more second media items, etc.) to the components of the system 100.

In certain embodiments, the applications 107 may utilize location-based technologies (e.g., GPS, cellular triangulation, Assisted GPS (A-GPS), etc.) to make a request to one or more services 113 for location-based data (e.g., mapping and/or navigation information) based on a position relative to a UE 101. For example, the UE 101 may include a GPS receiver to obtain geographic coordinates from the satellites 117 to determine its current location.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, media generation platform 103, the applications 107, the services platform 111, the services 113, the content provider 115, and the satellites 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
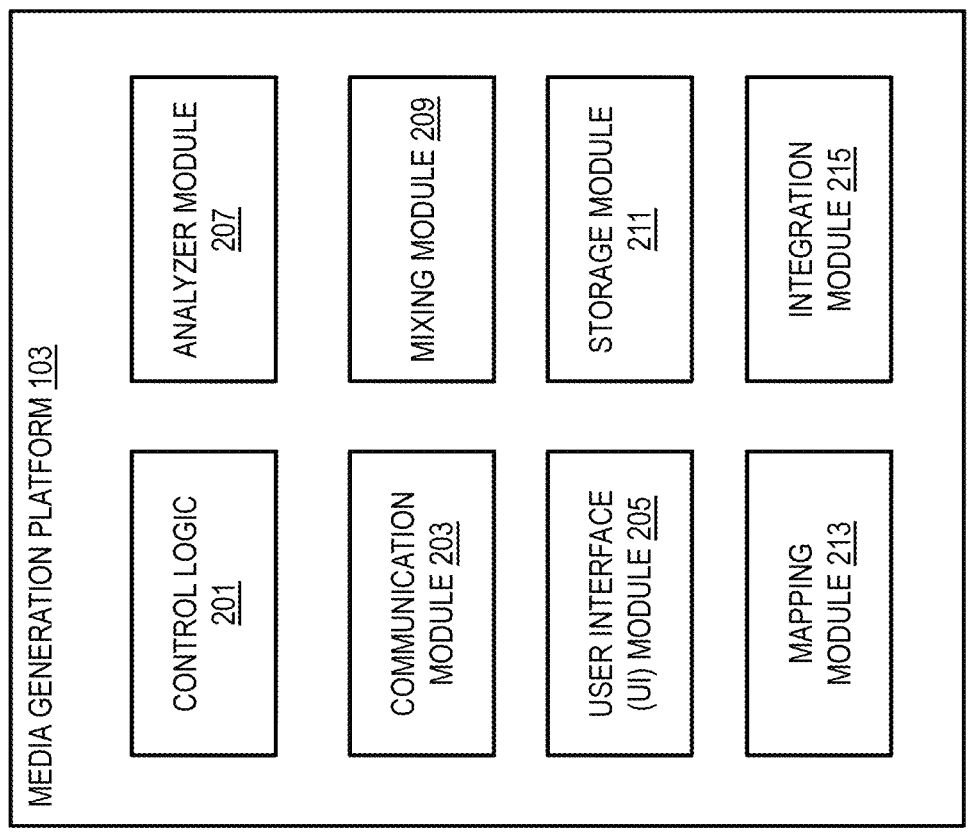
FIG. 2 is a diagram of the components of a media generation platform, according to one embodiment.
Figure 3B:
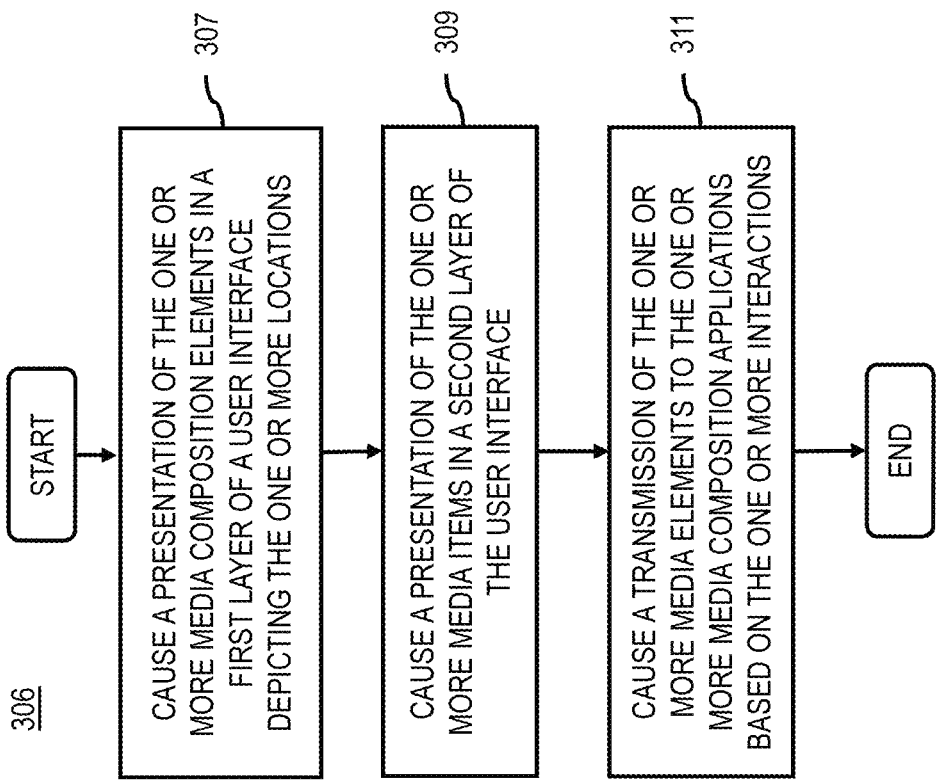
Figure 3A:
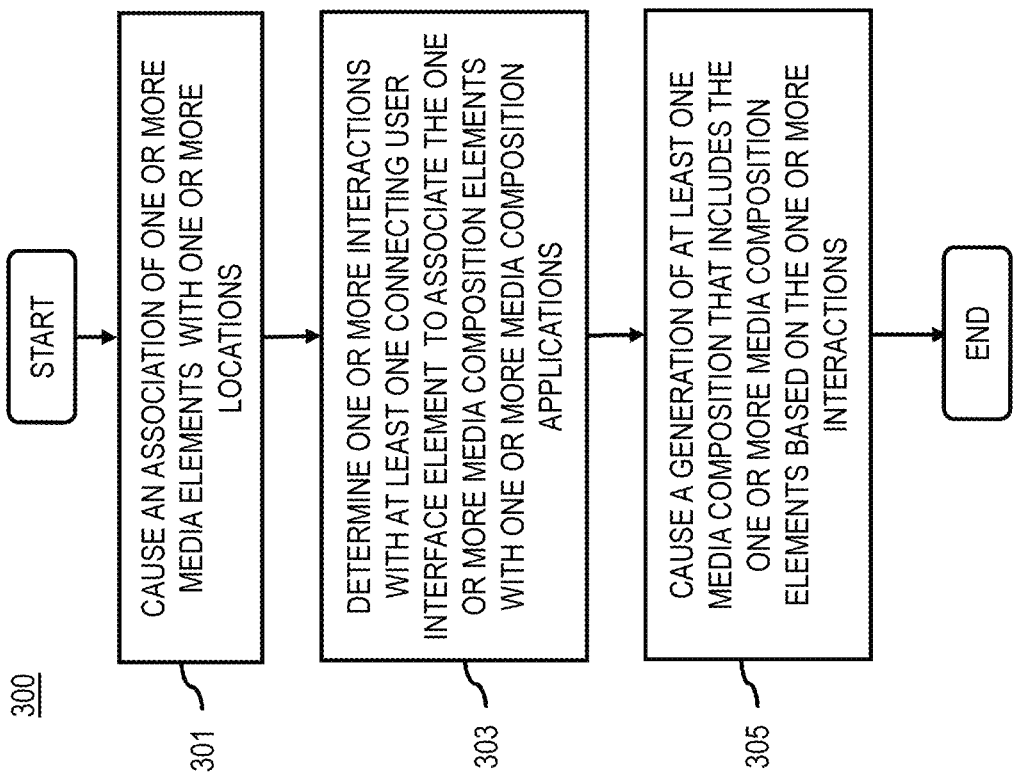
Figure 3D:
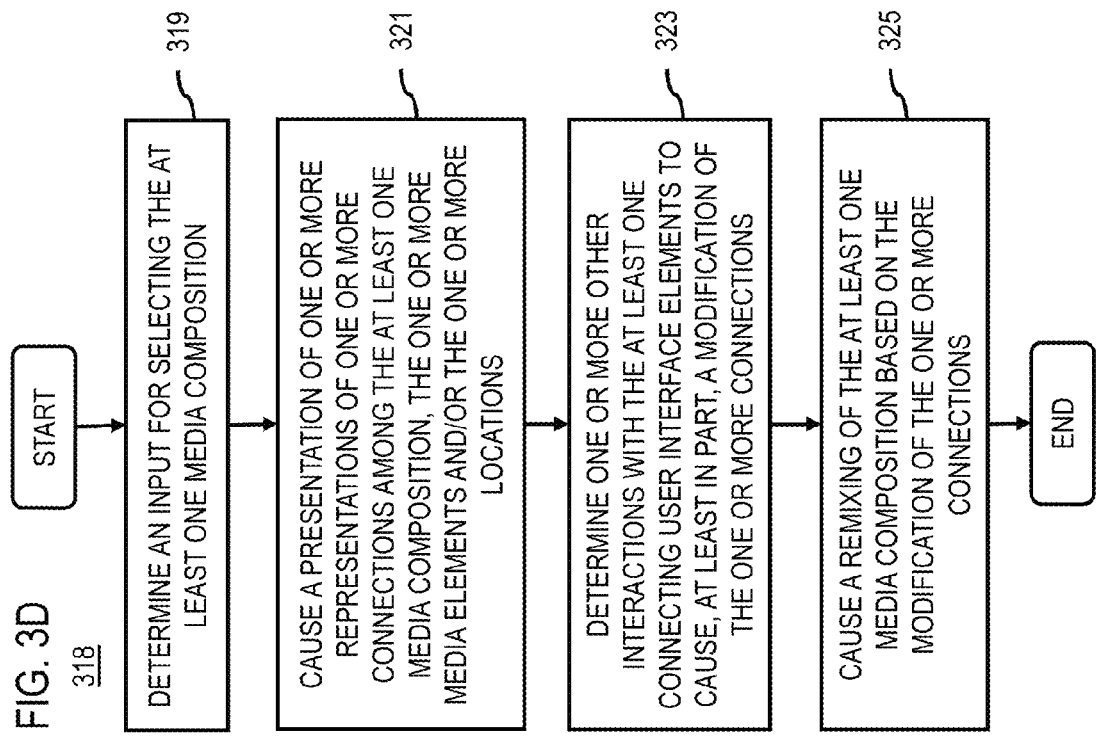
Figure 3C:
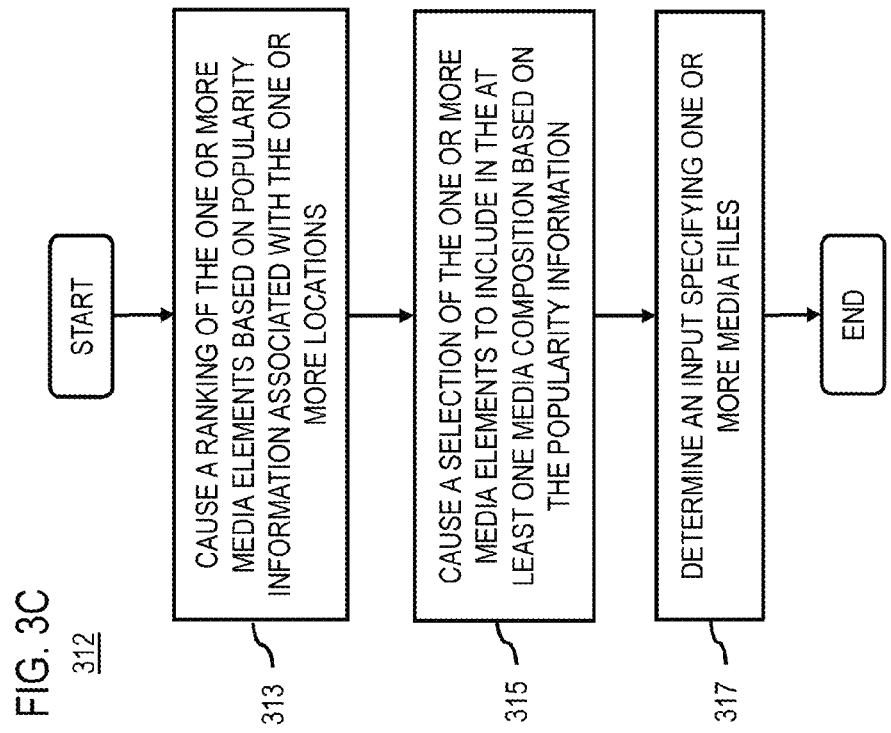

FIG. 2 is a diagram of the components of a media generation platform 103, according to one embodiment. By way of example, the media generation platform 103 includes one or more components for generating and sharing compositions based on media elements acquired from different locations. It is contemplated that the functions of these components may be combined in one or more components or performed by other components of equivalent functionality. In this embodiment, the media generation platform 103 includes a control logic 201, a communication module 203, a user interface (UI) module 205, an analyzer module 207, a mixing module 209, a storage module 211, a mapping module 213 and an integration module 215.

The control logic 201 oversees tasks, including tasks performed by the communication module 203, the user interface (UI) module 205, the analyzer module 207, the mixing module 209, and the storage module 211. For example, although other modules may perform the actual task, the control logic 201 may determine when and how those tasks are performed or otherwise direct the other modules to perform the task.

The communication module 203 is used for communication between the applications 107 of the UE 101 and the media generation platform 103. The communication module 203 is also used for communication between the applications 107 and the services 113 of the services platform 111, content providers 115, the media database 109 and the satellites 117. The communication module 203 may also be used to render the media elements (e.g., a music sample) in the application 107 (e.g., a media player) as well as the one or more personalized media compositions. The media items may be rendered in connection with a mapping module 213, which accesses data for representing the location of the various media elements to a map. The communication module 203, in connection with the user interface module 205 and the storage module 211, also may be used to cause one or more associations of the stored, shared, or a combination thereof compositions with the application. As such, various songs, videos and other media compositions may be rendered to a user via the application 107 for selection, review, or addition to a playlist.

The communication module 203 may also be used, in connection with the analyzer module 207, to retrieve media elements such as in response to a search command (e.g., a drum loop) based on GPS coordinates determined by the analyzer module 207.

The user interface (UI) module 205 operates in connection with the mixing module 209 to enable the rendering and execution of one or more virtual cables for connecting elements featured to a map by the mapping module 213 with a patch bay (input panel) represented via the application. In addition, the UI module regulates the connection and/or disconnection of the virtual cables by the user for enabling execution or creation of a remix via the mixing module 209. As previously discussed, it is contemplated that the user interface module 205 enables the virtual cable to contact the respective patch bays in a manner similar to patching circuits in a patch bay found in a recording and/or production studio.

In certain embodiments, the user interface module 205, in connection with the communication module 203, may also be used to determine one or more other interactions with (a) one or more other controls (e.g., a volume knob), one or more parameters (e.g., repeat, shuffle, etc.), or a combination thereof associated with the application 107 (e.g., a media player); (b) the at least one connecting user interface element (e.g., a virtual cable); or a combination thereof to cause one or more modifications of the one or more renderings of the mix item. The user interface module 205, in connection with the communication module 203 and the storage module 211, also may be used to store (e.g., in the media database 109), to share (e.g., with the services 113), or a combination thereof the one or more media compositions.

The analyzer module 207 may be used to determine the GPS coordinates of the location within the mapping and/or navigation application that the virtual cable is connected to (e.g., Harlem). In addition, the analyzer module 207 may interpret search commands for specific media elements (e.g., keyword search for "Salsa Music"). Still further, the analyzer module 207 may analyze levels of conquering associated with one or more media elements and publishers thereof for a given geographic location. This execution is performed in connection with the mapping module 213.

The mixing module 209 is used to mix media items (e.g., one or more drum loops, one or more audio samples, one or more virtual instruments, etc.) for composition purposes. The mixing module 209 may also operate in connection with the application 107 (e.g., media player) to enable generation of playlists. In certain embodiments, the mixing module 209 operates in connection with the communication module 203 and user interface module 205 enable retrieval of commercial media compositions and composed media selections to be displayed to users via the application 107. It is contemplated that the mixing module 209 may mix the media items based, at least in part, on one or more time scale modification, one or more beat matching, one or more tempo matching, one or more rhythm matching, or a combination thereof processes. By way of example, the mixing module 209, in connection with the analysis module 207, may mix the media items based on beat and downbeat analysis methods such that the drum loop is (1) time-stretched to make the drum loop tempo match the tempo of the active first media item and (2) the first beat of each measure of the drum loop is matched to the downbeats of the first media item.

It is noted that the mixing module 209 is an optional execution of the media generation platform 103, as various steps of the above described executions may be performed directly by the application 107. The integration module 215 and user interface module 205 may facilitate calling of an application user interface (API) for facilitating these executions. For example, a third party media generation application may call functions offered by the API for enabling the connecting of virtual cables to one or more media elements rendered to a map interface.

The storage module 211 is used to manage the storage of the one or more stored, shared, or a combination thereof media compositions, metadata regarding the one or more first media items (e.g., a music playlist or sample) associated and/or stored on the mobile device rendering the one or more mix items (e.g., the UE 101), and one or more other images that can be mixed by the media generation platform 103 with one or more graphical elements (e.g., a video or television stream).

Figure 6:
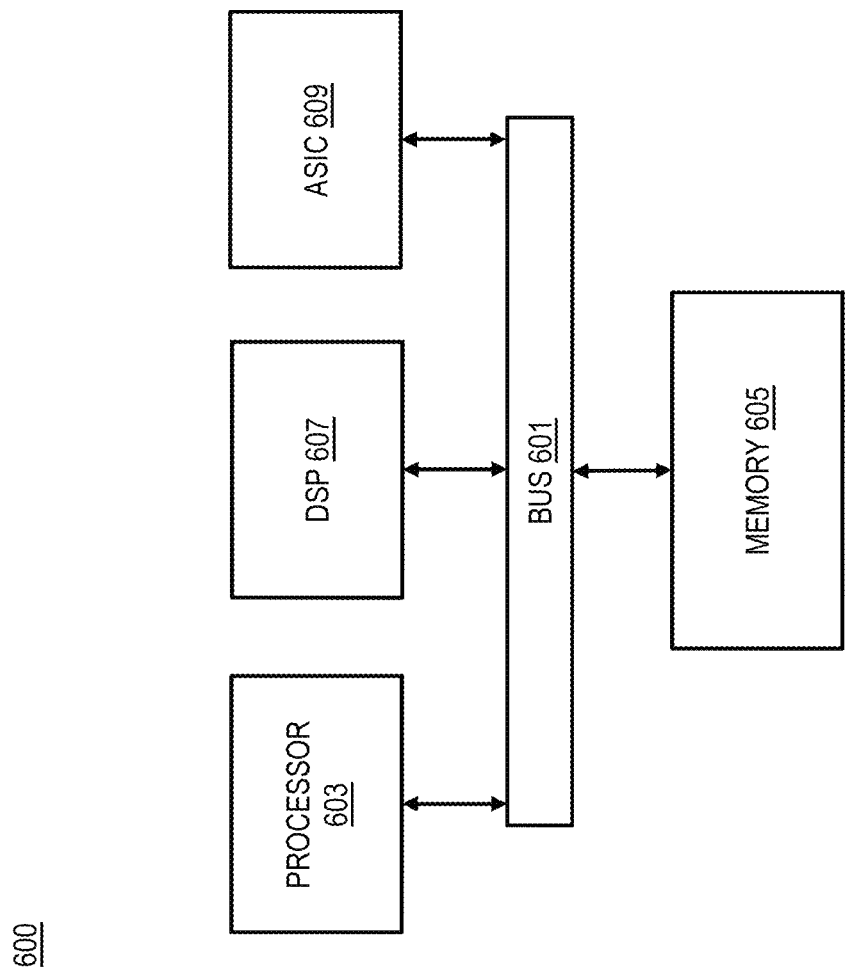
FIG. 6 is a diagram of a chip set that can be used to implement an embodiment of the invention.

FIGS. 3A-3E are flowcharts of exemplary processes for generating and sharing compositions based on media elements acquired from different locations, according to various embodiments. In one embodiment, the media generation platform 103 performs the process 300 and is implemented in, for instance, a chip set including a processor and a memory as shown in FIG. 6.

In step 301, the media generation platform 103 causes an association of one or more media elements with one or more locations. Per step 303, the platform 103 determines one or more interactions with at least one connecting user interface element to associate the one or more media composition elements with one or more media composition applications. As noted previously, the connecting user interface element may correspond to a virtual cable for facilitating transference of a media element to an input receptacle of the media composition application. In another step 305, the platform 103 causes a generation of at least one media composition that includes the one or more media composition elements based on the one or more interactions.

In step 307 of process 306 (FIG. 3B), the media generation platform 103 causes a presentation of the one or more media composition elements in a first layer of a user interface depicting the one or more locations. In step 309, a presentation of the one or more media items in a second layer of the user interface is caused. In another step 311, the platform 103 causes a transmission of the one or more media elements to the one or more media composition applications based on the one or more interactions. Of note, the at least one media composition is based, at least in part, on the transmission—i.e., as facilitated via a virtual cable connection.

In step 313 of process 312 (FIG. 3C), the media generation platform 103 causes a ranking of the one or more media elements based on popularity information associated with the one or more locations. The ranking may correspond to a popularity rating or access ranking attributed to the media elements by one or more users—i.e., those who access the media items once published or made available for consumption.

In another step 315, the platform 103 causes a selection of the one or more media elements to include in the at least one media composition based on the popularity information. Per step 317, the platform 103 determines an input specifying one or more media files. As noted previously, the at least one media composition is based, at least in part, on a compositing of the one or more media elements into the one or more media files. The media files may correspond to different waveform formats.

In step 319 of process 318 (FIG. 3D), the media generation platform 103 determines an input for selecting the at least one media composition. In step 321, the platform 103 causes a presentation of one or more representations of one or more connections among the at least one media composition, the one or more media elements and/or the one or more locations.

In another step 323, the platform 103 determines one or more other interactions with the at least one connecting user interface elements to cause, at least in part, a modification of the one or more connections. This may correspond to a connecting or disconnecting of a virtual cable between the application 107 and a particular media element location as represented on a map. In another step 325, the platform 103 causes a remixing of the at least one media composition based on the modification of the one or more connections. This may correspond, for example, to an adaptation of the connection from one media element (e.g., a saxophone sample) to another media element (e.g., a flute sample) within the same or different geographic location.

In step 327 of process 326 (FIG. 3E), the media generation platform 103 causes a presentation of information associated with the one or more media elements and/or the one or more locations during a playback of the at least one media composition. As such, the user is able to readily associate a given media element (e.g., a sample) with a particular composition of which the sample was used.

In another step 329, the platform 103 processes the at least one media composition and/or one or more other media compositions to determine popularity information associated with the one or more media elements and/or the one or more locations. Per step 331, the platform 103 determines the at least one media composition and/or the one or more media elements to associate with the one or more locations based on conquering status information associated with at least one user. As mentioned previously, the popularity and conquering status may correspond to a level of sharing of one or more media elements, a level of accessing and/or requesting of one or more media elements, or a combination thereof. Hence, a higher level of accessing of a published media item—i.e., higher popularity—may correspond to increased conquering status for the at least one user.

FIGS. 4A-4E are diagrams of user interfaces utilized in the exemplary processes of FIGS. 3A-3E, according to various embodiments. For the purpose of illustration, the diagrams are described from the perspective of an exemplary use case of a user of a mobile device composing media and publishing med for consumption by others. It is noted that while the user interface depictions correspond to the process of interaction with a media generation and/or listening application, various additional screens may also be featured based on interaction of the device 400 with the media generation platform 103.

Figure 4A:
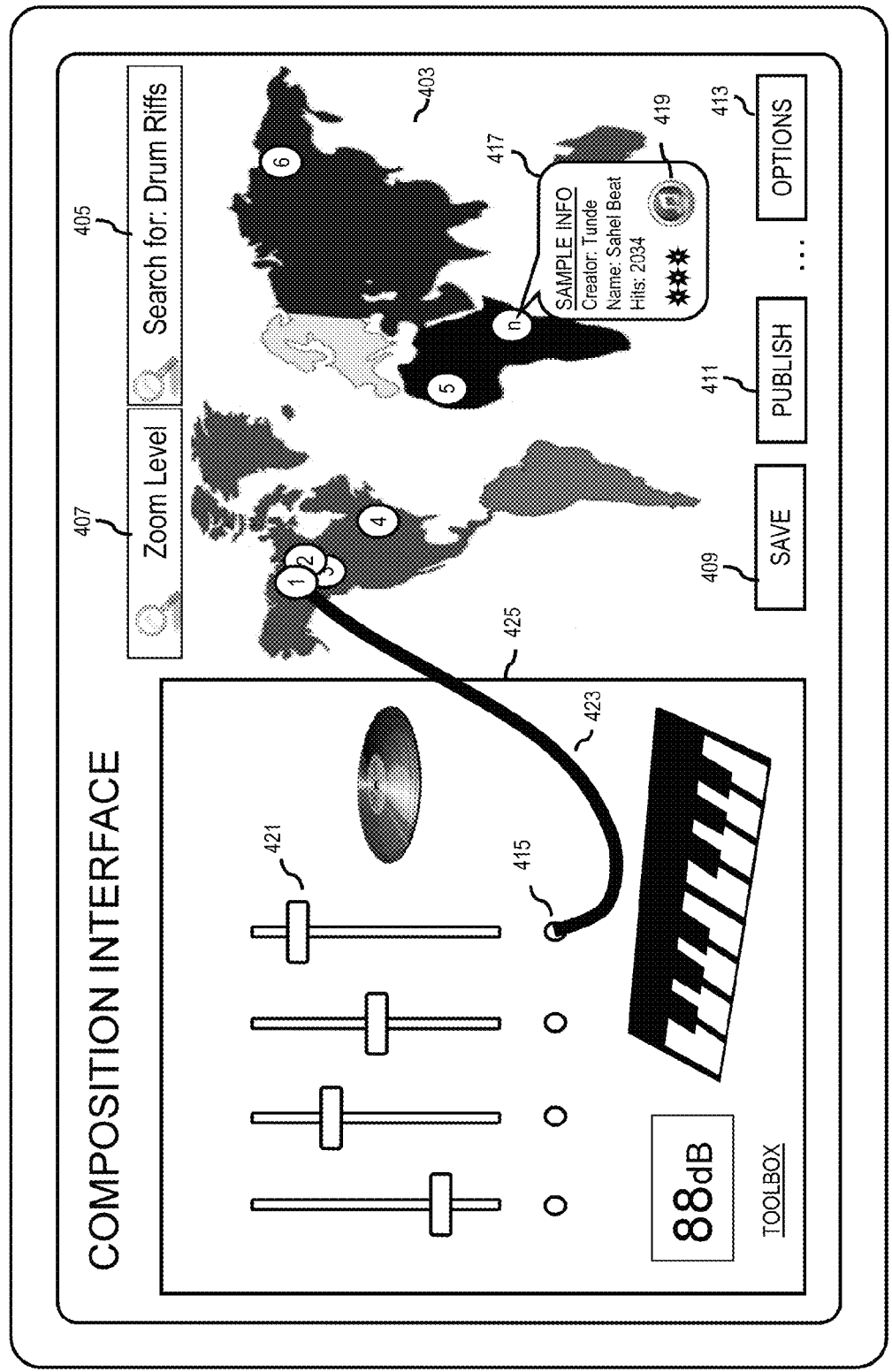
FIGS. 4A-4E are diagrams of user interfaces utilized in the exemplary processes of FIGS. 3A-3E, according to various embodiments.

In FIG. 4A, the user of mobile device 400 (e.g., a tablet) composes media based on the various media elements available for selection by various other users. The other media elements are depicted as originating from various locations on a map interface 403 and are labeled 1-$n$ respectively. By way of example, a cluster of media elements 1-3 is shown to originate in Canada, while a single media element is shown to originate from the United States (labeled 4). Although not illustrated here, the map interface 403 may be zoomed in to display e.g. a county, a city, a city block or even a single building. The media elements are presented, for example, in response to a search data input 405 for "Drum Riffs."

The user may preview and/or receive additional details regarding a particular media element as presented to the map. For example, the user may perform a mouse over of a particular element to view a callout message 417 for indicating various details regarding the media element. The information presented may include the name of the creator/publisher of the media element, the file name associated with the media element, a number of hits (accessing of the media element) and a ranking of the media element relative to other related media elements. Also presented with the callout message 417 is a preview button 419, which upon selection, enables the user to listen to, view or otherwise consume the media element or a portion thereof. In the case of a drum riff, for example, the drum riff associated with the media element labeled n may be previewed against that associated with the media element labeled 6.

Once the suitable media element (e.g., sample) is identified by the user, it can be patched with virtual cables 423 to the compatible composing software front-end, such as for a composition application. In this case, the virtual cable 423 is activated to enable a connection between an input 415 of the software front end 425 and the media element labeled 1. While various techniques may be employed for generating the virtual cable 423, the use case herein contemplates generation of the cable in response to clicking of the input 415 followed by clicking of label 1. The user may then adjust the volume level associated with this input by way of a volume adjustment tab 421.

Figure 4B:
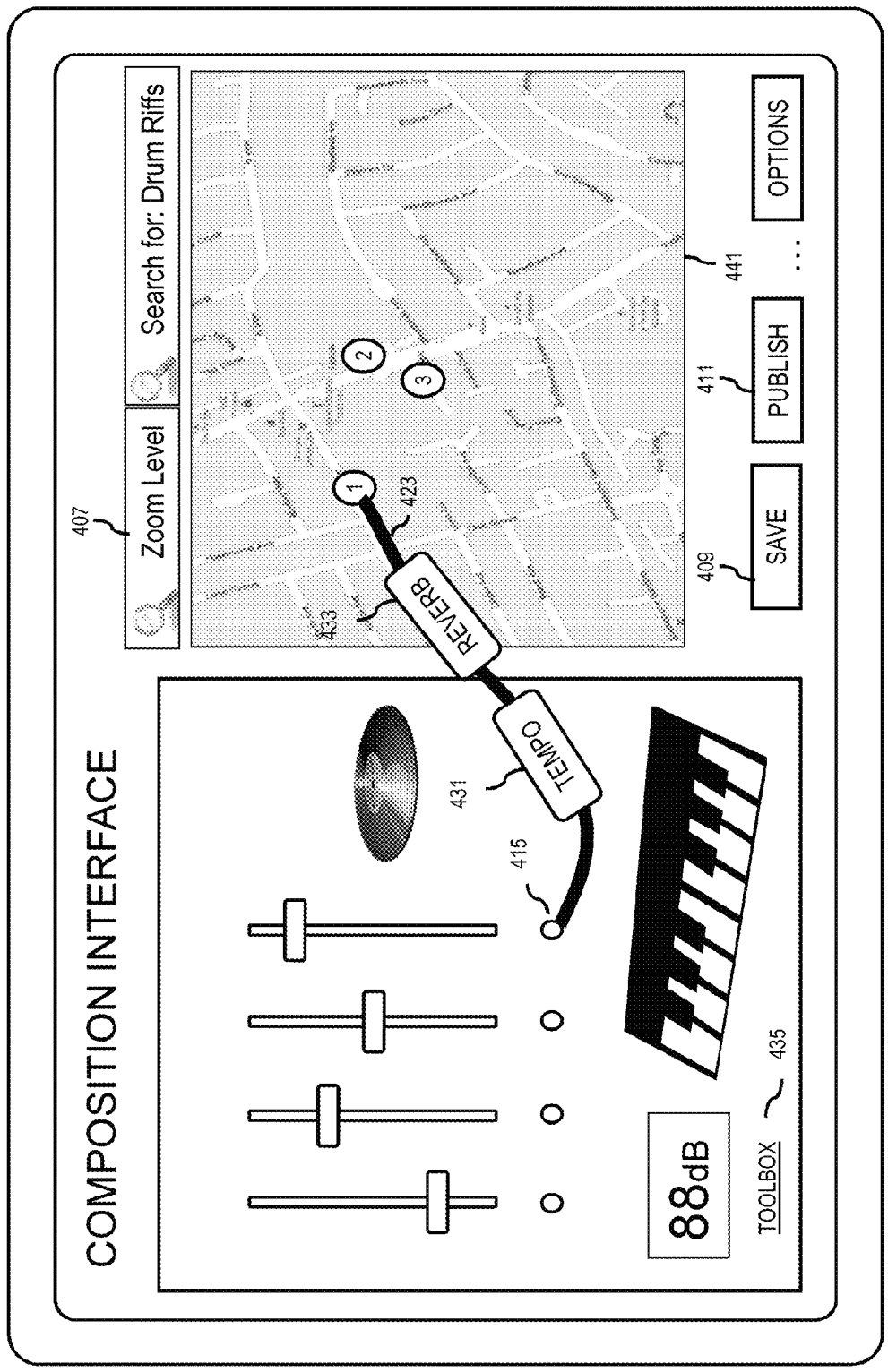

In FIG. 4B, the user adjusts the granularity of the map using the zoom level action button 407 to focus more narrowly on the area related to labels 1-3. From this map view, the user is able to see the high concentration of other samples related to the media element labeled 1 as selected. Also, the user may activate a toolbox link 435 to invoke various additional mixing elements related to the media element labeled 1. For example, the user may include and/or add various affects to the patched media element, including a change in tempo 431 or reverberation effect 433. The platform 103 may enable rendering of visual elements, e.g., a button or interactive widget, for representing these effects with respect to the API generated in connection with the application 107. In this scenario, the tempo matching 431 and reverberation effect 433 are shown as being placed directly along the virtual cable 423 for incorporating the effect.

Once the user has composed the media to their liking, they can save the composition by activating the SAVE action button 409. They can also publish the composition, for access by others, by activating the PUBLISH action button 411. Various other buttons and options related to the mixing and/or editing of media may also be available. Of note, the location and/or point of origination of the respective media elements is presented concurrent with an interface for enabling selection and/or processing of said elements.

Figure 4C:
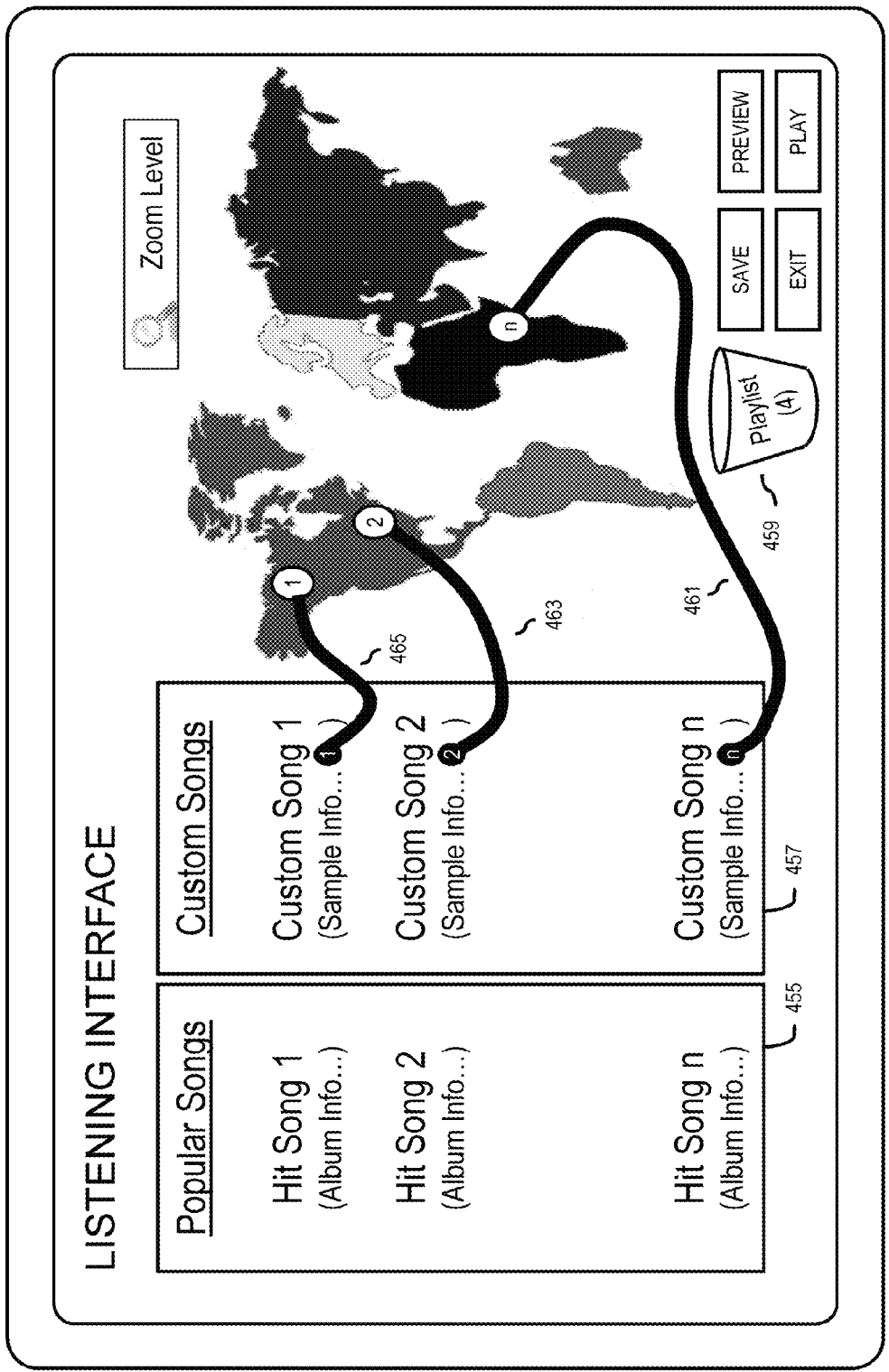

In FIG. 4C, the user of the media generation platform 103 as accessed via a listening interface application, can access both commercial media compositions 455 and those 457 composed/published by various users. Under this scenario, the user may select various media compositions from these particular lists 455 (Popular Songs) and 457 (Custom Songs) for addition to a playlist, i.e., built by way of a drag-and-drop selection action of an particular composition to a playlist bucket 459. Per the execution of the platform 103, while listening to a particular composed composition (e.g., as per the Custom Songs list), the user is able to see the virtual cable connections 461-465 to the corresponding locations of media elements used in generation of the composition. For example, a media composition entitled "Custom Song 1" includes a sampled sound corresponding to the media element labeled 1 corresponding to a location in Canada. As another example, a media composition entitled "Custom Song 2" includes a sampled sound corresponding to the media element labeled 2 corresponding to a location in the United States. By way of this execution, the user is able to readily identify a location from which a particular sample, loop or other media element incorporated into the composition was derived.

Figure 4D:
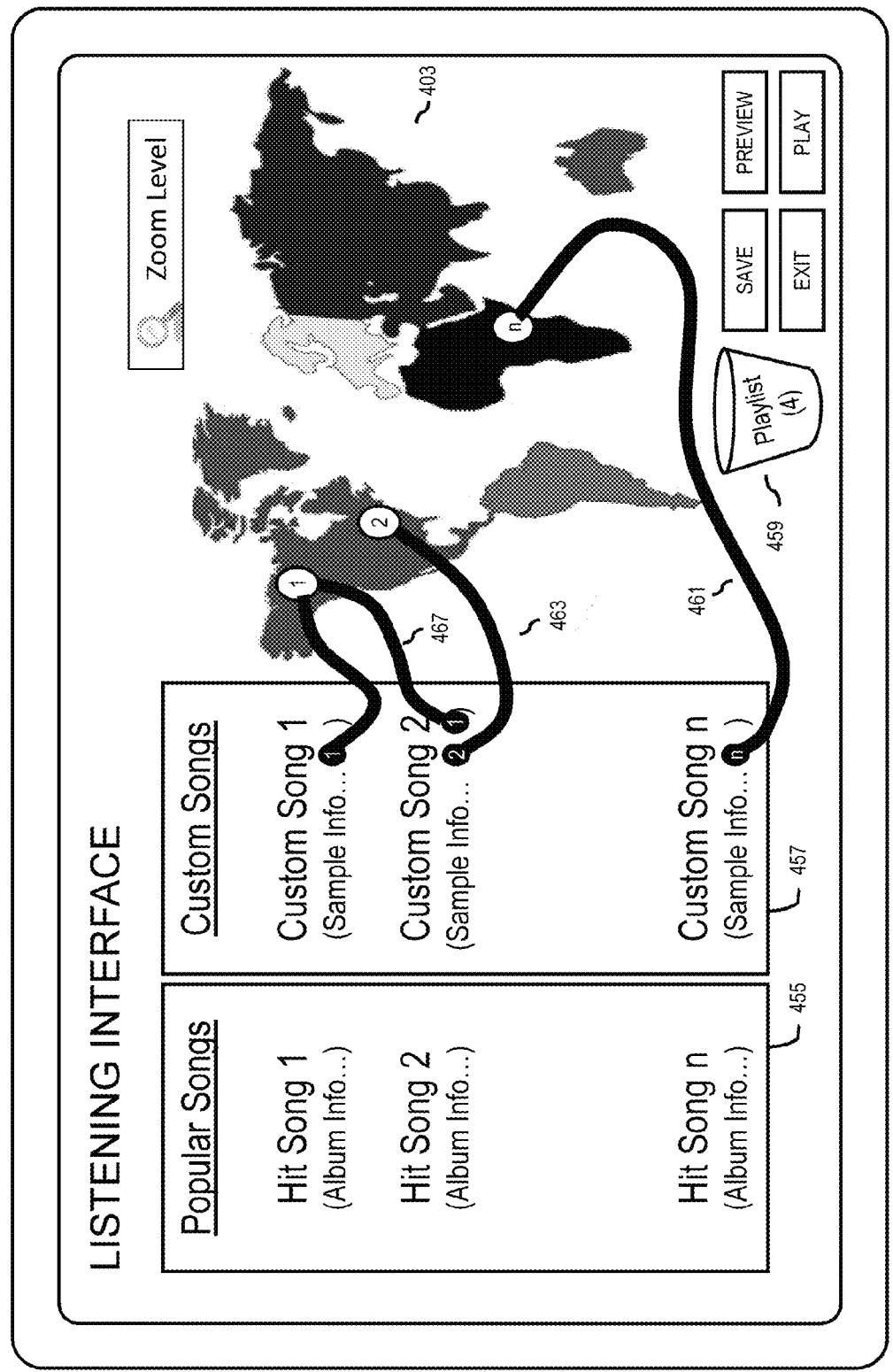
Figure 4E:
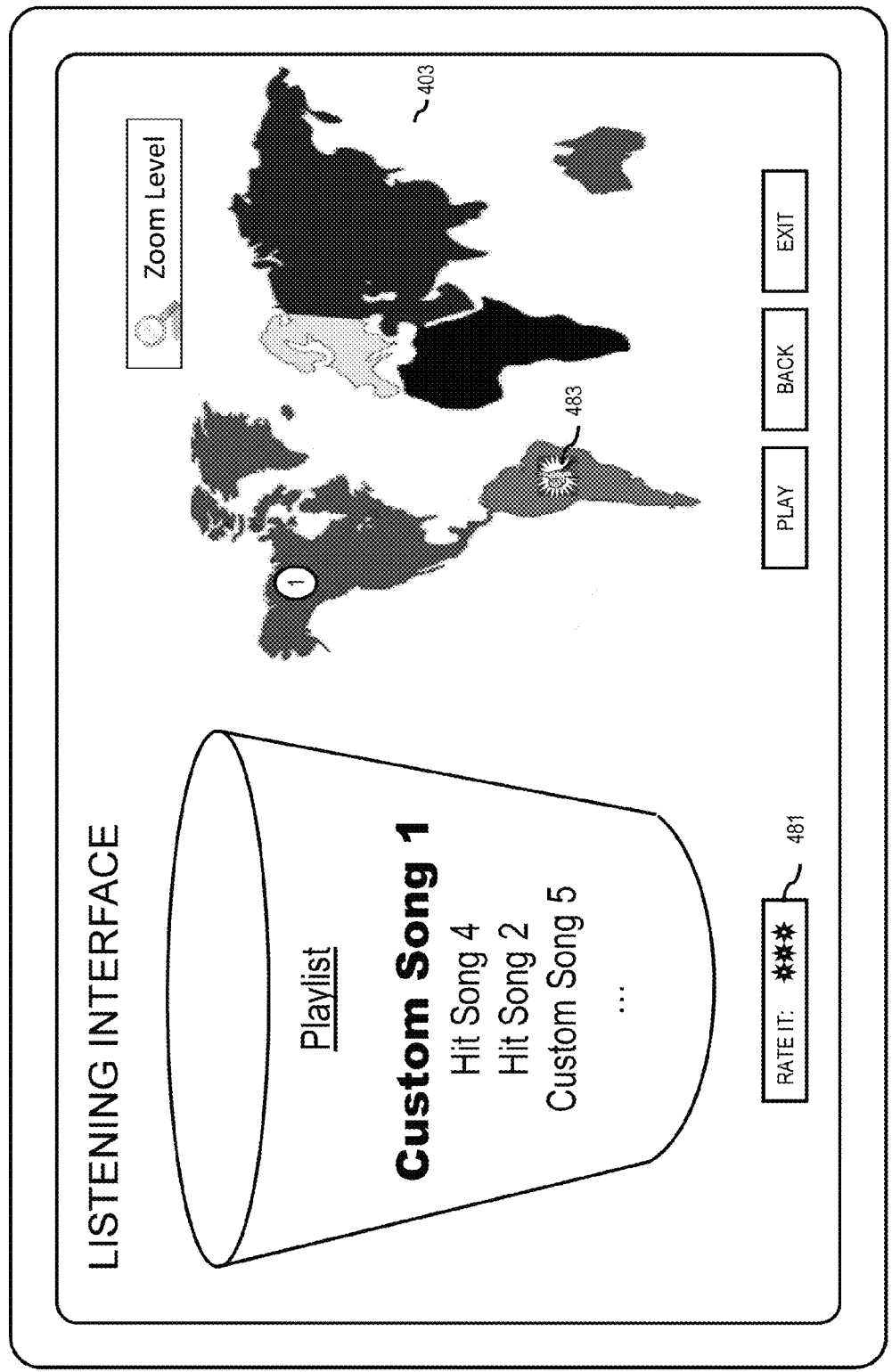

In FIG. 4D, the user can create new remixes of the composed media selections, e.g., per list 457, by changing the virtual cable connection. This includes, for example, disconnecting a particular virtual cable to thus eliminate a connection and hence use of a particular media element for a given composition. As another example, the user may associate a given selection with different or additional locations on the map. This is presented by way of virtual cable 467 being connected with the composition entitled "Custom Song 2." Under this scenario, "Custom Song 2" is now associated with multiple samples. The sequence of the samples may also be manipulated to affect the quality of the remix.

It is noted that different areas of the map interface 403 may be highlighted in some way (e.g., illuminated) as the different media elements are played during playback of the composition (e.g., the song). By way of example, in FIG. 4E, as "Custom Song 1" is played, Label 1 corresponding to the location of a media element related to the song blinks, shakes or is otherwise highlighted within the map interface 403.

Still further, an icon 483 is presented to the user interface for enabling the user to identify an area within the world corresponding to the highest conquering level. The conquering level may correspond to a specific level of accessing and/or sharing of media elements for this geographic region. The user may rate the media composition by way of a rating selector 481, to further affect the conquering details.

The processes described herein for generating and sharing compositions based on media elements acquired from different locations may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
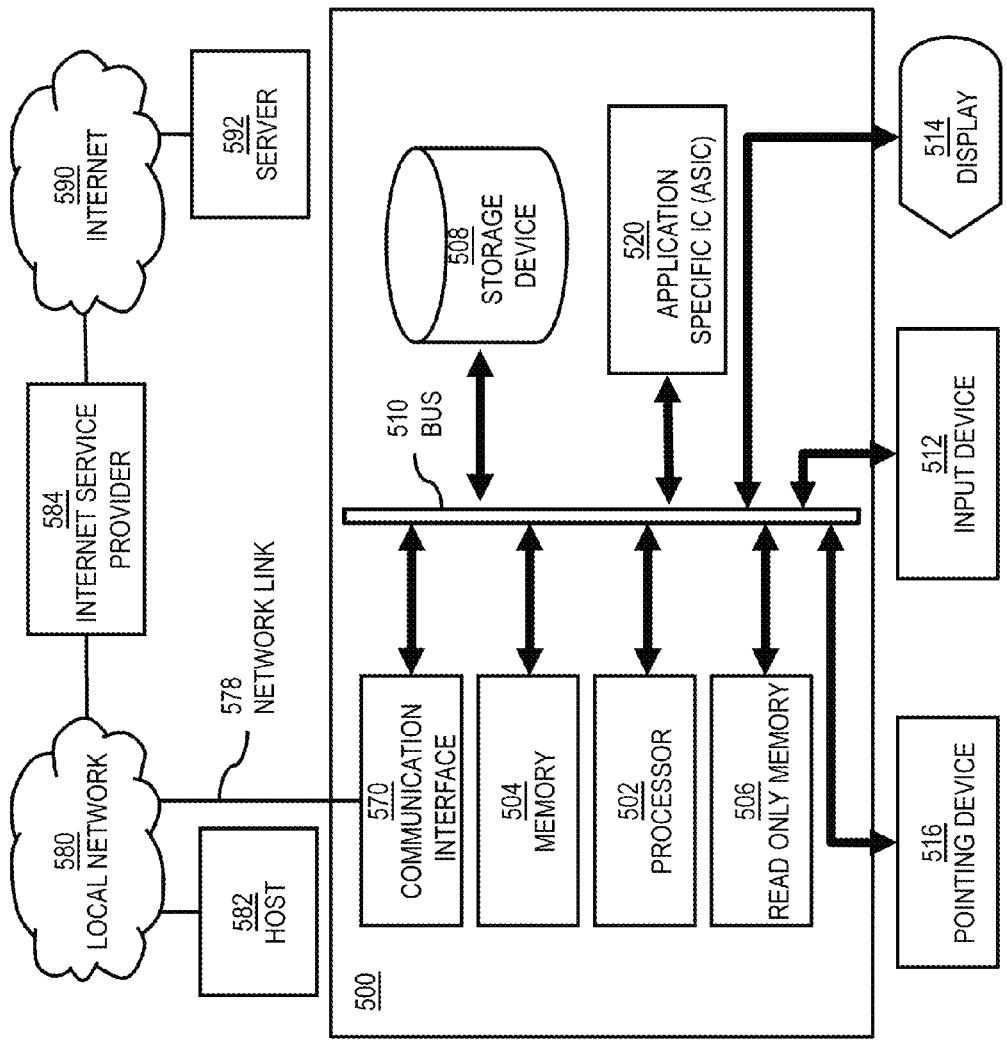
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to generate and share compositions based on media elements acquired from different locations as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of generating and sharing compositions based on media elements acquired from different locations.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to generate and share compositions based on media elements acquired from different locations. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for generating and sharing compositions based on media elements acquired from different locations. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for generating and sharing compositions based on media elements acquired from different locations, is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for generating and sharing compositions based on media elements acquired from different locations to the UE 101.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to generate and share compositions based on media elements acquired from different locations as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of generating and sharing compositions based on media elements acquired from different locations.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to generate and share compositions based on media elements acquired from different locations. The memory 605 also stores the data associated with or generated by the execution of the inventive steps.

Figure 7:
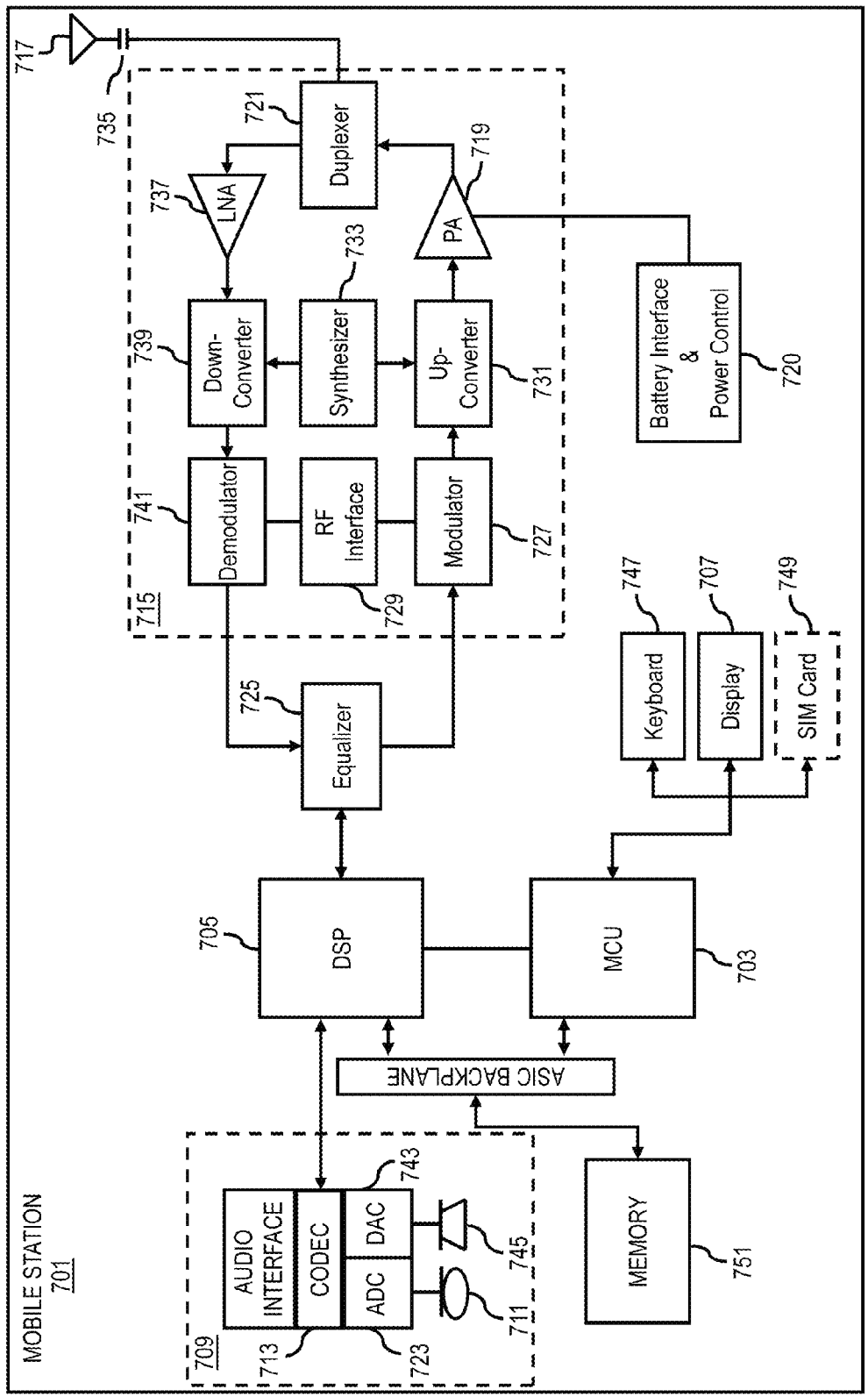
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps of generating and sharing compositions based on media elements acquired from different locations. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of generating and sharing compositions based on media elements acquired from different locations. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to generate and share compositions based on media elements acquired from different locations. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   an association of media elements with locations of origination of the media elements;
   at least one determination of one or more interactions on a user device with at least one connecting user interface element to associate the media elements with one or more media composition applications;
   a generation of at least one media composition that includes, at least in part, input of the media elements based, at least in part, on the one or more interactions;
   a storage of information including the at least one media composition, a location of origination of the at least one media composition, and the association; and
   a visual map presentation on the user device showing the at least one media composition at the location of origination and the information near the location of origination, wherein the visual map presentation includes the media elements and the locations of origination during a playback of the at least one media composition.

2. The method of claim 1, wherein the (1) data and/or (2) information and/or (3) at least one signal are further based, at least in part, on the following:
   a presentation of one or more of the media elements in a first layer of a user interface depicting the locations of origination; and
   a presentation of one or more other media elements in a second layer of the user interface.

3. The method of claim 1, wherein a second of the one or more media composition applications is a location-based application and wherein the (1) data and/or (2) information and/or (3) at least one signal are further based, at least in part, on the following:
   a transmission of the media elements to the one or more media composition applications based, at least in part, on the one or more interactions, wherein the at least one media composition is based, at least in part, on the transmission.

4. The method of claim 1, wherein the (1) data and/or (2) information and/or (3) at least one signal are further based, at least in part, on the following:
   a ranking of the media elements based, at least in part, on popularity information associated with the locations of origination; and
   a selection of the media elements to include in the at least one media composition based, at least in part, on the popularity information.

5. The method of claim 1, wherein a second of the one or more media composition applications is a social networking application and wherein the (1) data and/or (2) information and/or (3) at least one signal are further based, at least in part, on the following:
   an input specifying one or more media files,
   wherein the at least one media composition is based, at least in part, on a compositing of the media elements into the one or more media files.

6. The method of claim 1, wherein a first of the media elements includes, at least in part, one or more graphical elements and wherein the (1) data and/or (2) information and/or (3) at least one signal are further based, at least in part, on the following:
   an input for selecting the at least one media composition; and a presentation of one or more representations of one or more connections among the at least one media composition, the media elements, the locations of origination, or a combination thereof.

7. The method of claim 1, wherein the media elements include, at least in part, text and wherein the (1) data and/or (2) information and/or (3) at least one signal are further based, at least in part, on the following:

one or more other interactions with the at least one connecting user interface elements to cause, at least in part, a modification of the one or more connections; and a remixing of the at least one media composition based, at least, in part, on the modification of the one or more connections.

8. The method of claim 1, wherein a second of the one or more media composition applications is an organizational application, and wherein the (1) data and/or (2) information and/or (3) at least one signal are further based, at least in part, on the following:

a notification to a composer of the at least one media composition of accessing, adapting, or a combination thereof of the at least one media composition.

9. The method of claim 4, wherein the (1) data and/or (2) information and/or (3) at least one signal are further based, at least in part, on the following:

a processing of at least one media composition, one or more other media compositions, or a combination thereof to determine popularity information associated with the media elements, the locations of origination, or a combination thereof.

10. The method of claim 4, wherein the (1) data and/or (2) information and/or (3) at least one signal are further based, at least in part, on the following:

at least one determination of the at least one media composition, the media elements, or a combination thereof to associate with the locations of origination based, at least in part, on the conquering status information.

11. An apparatus comprising:
at least one processor; and
at least one memory including computer program code for one or more programs, the at least one memory and the computer program code configured to, with the at least one processor, cause the apparatus to perform at least the following, causing, at least in part, an association of media elements with locations of origination of the media elements;

determining one or more interactions on a user device with at least one connecting user interface element to associate the media elements with one or more media composition applications;

causing, at least in part, a generation of at least one media composition that includes, at least in part, input of the media elements based, at least in part, on the one or more interactions;

causing, at least in part, a storage of information including the at least one media composition, a location of origination of the at least one media composition, and the association; and causing, at least in part, a visual map presentation on the user device showing the at least one media composition at the location of origination and the information near the location of origination, wherein the visual map presentation includes the media elements and the locations of origination during a playback of the at least one media composition.

12. The apparatus of claim 11, wherein the apparatus is further caused to:

causing, at least in part, a presentation of one or more media elements in a first layer of a user interface depicting the locations of origination; and causing, at least in part, a presentation of one or more other media elements in a second layer of the user interface.

13. The apparatus of claim 11, wherein a second of the one or more media composition applications is a location-based application and wherein the apparatus is further caused to:

causing, at least in part, a transmission of the media elements to the one or more media composition applications based, at least in part, on the one or more interactions, wherein the at least one media composition is based, at least in part, on the transmission.

14. The apparatus of claim 11, wherein the apparatus is further caused to:

causing, at least in part, a ranking of the media elements based, at least in part, on popularity information associated with the locations of origination; and causing, at least in part, a selection of the media elements to include in the at least one media composition based, at least in part, on the popularity information.

15. The apparatus of claim 11, wherein a second of the one or more media composition applications is a social networking application and wherein the apparatus is further caused to:

determining an input specifying one or more media files, wherein the at least one media composition is based, at least in part, on a compositing of the media elements into the one or more media files.

16. The apparatus of claim 11, wherein a first of the media elements includes, at least in part, one or more graphical elements and wherein the apparatus is further caused to:

determining an input for selecting the at least one media composition; and causing, at least in part, a presentation of one or more representations of one or more connections among the at least one media composition, the media elements, the locations of origination, or a combination thereof.

17. The apparatus of claim 11, wherein the media elements include, at least in part, text and wherein the apparatus is further caused to:

determining one or more other interactions with the at least one connecting user interface elements to cause, at least in part, a modification of the one or more connections; and causing, at least in part, a remixing of the at least one media composition based, at least, in part, on the modification of the one or more connections.

18. The apparatus of claim 11, wherein a second of the one or more media composition applications is an organizational application and wherein the apparatus is further caused to:

causing, at least in part, a presentation of information associated with the media elements, the locations of origination, or a combination thereof during a playback of the at least one media composition.

19. The apparatus of claim 14, wherein the apparatus is further caused to:

processing and/or facilitating a processing of the at least one media composition, one or more other media compositions, or a combination thereof to determine popularity information associated with the media elements, the locations of origination, or a combination thereof.

20. The apparatus of claim 11, wherein the apparatus is further caused to:
    determining the at least one media composition, the media elements, or a combination thereof to associate with the locations of origination based, at least in part, on conquering status information associated with at least one user.

* * * * *